(12) United States Patent
Gkoulalas-Divanis et al.

(10) Patent No.: US 11,763,026 B2
(45) Date of Patent: Sep. 19, 2023

(54) ENABLING APPROXIMATE LINKAGE OF DATASETS OVER QUASI-IDENTIFIERS

(71) Applicant: International Business Machines Corporation, Armonk, NY (US)

(72) Inventors: Aris Gkoulalas-Divanis, Waltham, MA (US); Christopher Lennard Zwarts, Markham (CA); Denis Ricard, Markham (CA)

(73) Assignee: International Business Machines Corporation, Armonk, NY (US)

( * ) Notice: Subject to any disclaimer, the term of this patent is extended or adjusted under 35 U.S.C. 154(b) by 262 days.

(21) Appl. No.: 17/317,036

(22) Filed: May 11, 2021

(65) Prior Publication Data
US 2022/0366073 A1 Nov. 17, 2022

(51) Int. Cl.
G06F 21/62 (2013.01)
G06F 16/2455 (2019.01)
G06F 16/23 (2019.01)
H04L 9/30 (2006.01)
H04L 9/06 (2006.01)

(52) U.S. Cl.
CPC ...... G06F 21/6245 (2013.01); G06F 16/2379 (2019.01); G06F 16/2456 (2019.01); H04L 9/0643 (2013.01); H04L 9/30 (2013.01); G06F 2221/2115 (2013.01); H04L 2209/16 (2013.01)

(58) Field of Classification Search
CPC ........ G06F 21/60; G06F 21/602; G06F 21/62; G06F 21/6209; G06F 21/6218; G06F 21/6227; G06F 21/6236; G06F 21/6245; G06F 21/6254; G06F 21/6272
See application file for complete search history.

(56) References Cited

U.S. PATENT DOCUMENTS

| 7,912,842 B1 | 3/2011 | Bayliss |
| 9,503,432 B2 | 11/2016 | El Emam et al. |
| 2002/0073099 A1 | 6/2002 | Gilbert et al. |
| 2015/0347624 A1 | 12/2015 | Villars |
| 2019/0188416 A1* | 6/2019 | Gkoulalas-Divanis ............ G06F 21/577 |

(Continued)

FOREIGN PATENT DOCUMENTS

| DE | 102010037326 B4 | 2/2014 |
| WO | WO2019/040874 A1 | 2/2019 |

*Primary Examiner* — Malcolm Cribbs
(74) *Attorney, Agent, or Firm* — Stephen J. Walder, Jr.; James Olsea

(57) ABSTRACT

A mechanism is provided in a first client for approximate linkage of datasets over quasi-identifiers. The mechanism receives a generalization logic data structure representing sets of values for each quasi-identifier in a first dataset of the first client. For each record in the first dataset, the mechanism generates at least one generalization of a value of a given quasi-identifier in the first dataset based on a selected generalization logic data structure corresponding to the given quasi-identifier and generates a generalized record for each of the at least one generalization to form a first generalized dataset. The mechanism sends the first generalized dataset to a semi-trusted third party for approximate linkage of the first dataset with a second dataset of a second client, receives an approximate join result from the semi-trusted third party, performs post-processing on the approximate join result, and determines a final linkage result based on the post-processing.

20 Claims, 10 Drawing Sheets

(56) References Cited

U.S. PATENT DOCUMENTS

| | | |
|---|---|---|
| 2019/0266352 A1 | 8/2019 | Gkoulalas-Divanis |
| 2020/0065522 A1* | 2/2020 | Hapfelmeier .......... G06F 16/28 |
| 2020/0265069 A1* | 8/2020 | Antonatos .......... G06F 21/6227 |
| 2021/0157932 A1* | 5/2021 | Blatt ...................... G06F 21/79 |
| 2021/0326475 A1* | 10/2021 | El Emam ................ G06F 17/18 |

* cited by examiner

| ID | LAT | LONG | AGE | NAME 601 | CREDIT CARD 602 |
|---|---|---|---|---|---|
| 1 | 58.55 | 88.45 | 25 | Ricard | 1234-5678-9123 |
| 2 | 15 | 18.91 | 42 | George | 5678-9123-4567 |

| ID | LAT | LONG | AGE | NAME 611 | CREDIT CARD 612 |
|---|---|---|---|---|---|
| 1 | 58.55 | 88.45 | 25 | Hash(Ricard) | Hash(1234-5678-9123) |
| 2 | 15 | 18.91 | 42 | Hash(George) | Hash(5678-9123-4567) |

| ID | LAT | LONG | SIM | AGE | SIM | NAME | CREDIT CARD |
|----|--------|-------|------|--------|------|--------------|-----------------------|
| 1  | 50-70  | 70-90 | 0.95 | 20-30  | 1    | Hash(Ricard) | Hash(1234-5678-9123)  |
|    | 50-90  | 50-90 | 0.86 | 20-40  | 0.95 |              |                       |
|    | 10-90  | 10-90 | 0.75 | 0-40   | 0.95 |              |                       |
|    | 110-130| 50-70 | 0.57 | 50-60  | 0.7  |              |                       |
|    | 90-130 | 50-90 | 0.65 | 40-60  | 0.77 |              |                       |
|    | 90-170 | 10-90 | 0.49 | 40-100 | 0.57 |              |                       |

| LAT/LONG | SIM | AGE | SIM |
|----------|------|--------------|------|
| Hash(50-70, 70-90) | 0.95 | Hash(20-30) | 1 |
| Hash(50-90, 50-90) | 0.86 | Hash(20-40) | 0.95 |
| Hash(10-90, 10-90) | 0.75 | Hash(0-40) | 0.95 |
| Hash(110-130, 50-70) | 0.57 | Hash(50-60) | 0.7 |
| Hash(90-130, 50-90) | 0.65 | Hash(40-60) | 0.77 |
| Hash(90-170, 10-90) | 0.49 | Hash(40-100) | 0.57 |

| LAT/LONG | SIM | AGE | SIM |
|----------|-----------|--------------|-----------|
| Hash(50-70, 70-90) | Encr(0.95) | Hash(20-30) | Encr(1) |
| Hash(50-90, 50-90) | Encr(0.86) | Hash(20-40) | Encr(0.95) |
| Hash(10-90, 10-90) | Encr(0.75) | Hash(0-40) | Encr(0.95) |
| Hash(110-130, 50-70) | Encr(0.57) | Hash(50-60) | Encr(0.7) |
| Hash(90-130, 50-90) | Encr(0.65) | Hash(40-60) | Encr(0.77) |
| Hash(90-170, 10-90) | Encr(0.49) | Hash(40-100) | Encr(0.57) |

CLIENT 1 DATASET 1010

| ID | LAT/LONG | SIM | AGE | SIM | NAME | CREDIT CARD |
|---|---|---|---|---|---|---|
| 1 | Hash(50-70, 70-90) | Encr(0.95) | Hash(20-30) | Encr(1) | Hash(Ricard) | Hash(1234-5678-9123) |
|   | Hash(50-90, 50-90) | Encr(0.86) | Hash(20-40) | Encr(0.95) | | |
|   | Hash(10-90, 10-90) | Encr(0.75) | Hash(0-40) | Encr(0.95) | | |
|   | Hash(110-130, 50-70) | Encr(0.57) | Hash(50-60) | Encr(0.7) | | |
|   | Hash(90-130, 50-90) | Encr(0.65) | Hash(40-60) | Encr(0.77) | | |
|   | Hash(90-170, 10-90) | Encr(0.49) | Hash(40-100) | Encr(0.57) | | |
| 2 | Hash(10-30, 10-30) | Encr(0.97) | Hash(40-50) | Encr(0.97) | Hash(George) | Hash(5678-9123-4567) |
|   | Hash(10-50, 10-50) | Encr(0.88) | Hash(40-60) | Encr(0.97) | | |
|   | Hash(10-90, 10-90) | Encr(0.71) | Hash(40-100) | Encr(0.77) | | |

*FIG. 10*

CLIENT 2 DATASET 1020

| ID | LAT/LONG | SIM | AGE | SIM | NAME | CREDIT CARD |
|---|---|---|---|---|---|---|
| 1 | Hash(50-70, 70-90) | Encr(0.95) | Hash(20-30) | Encr(0.98) | Hash(Richard) | Hash(1234-5678-9123) |
|   | Hash(50-90, 50-90) | Encr(0.86) | Hash(20-40) | Encr(0.97) | | |
|   | Hash(10-90, 10-90) | Encr(0.77) | Hash(0-40) | Encr(0.93) | | |
| 2 | Hash(30-50, 110-130) | Encr(0.93) | Hash(10-20) | Encr(0.97) | Hash(George) | Hash(4567-5678-9123) |
|   | Hash(10-50, 90-130) | Encr(0.98) | Hash(0-20) | Encr(0.92) | | |
|   | Hash(10-90, 90-170) | Encr(0.84) | Hash(0-40) | Encr(0.98) | | |
|   | Hash(110-130, 50-70) | Encr(0.37) | Hash(50-60) | Encr(0.63) | | |
|   | Hash(90-130, 50-90) | Encr(0.46) | Hash(40-60) | Encr(0.68) | | |
|   | Hash(90-170, 10-90) | Encr(0.29) | Hash(40-100) | Encr(0.48) | | |

FIG. 11

| ID | LAT/LONG | SIM | AGE | SIM | NAME | CC |
|---|---|---|---|---|---|---|
| 1 | H(50-70, 70-90) | E(0.95) | H(20-30) | E(1) | H(Ricard) | H(1234-5678-9123) |
| 1 | H(50-90, 50-90) | E(0.86) | H(20-40) | E(0.95) | H(Ricard) | H(1234-5678-9123) |
| 1 | H(10-90, 10-90) | E(0.75) | H(0-40) | E(0.95) | H(Ricard) | H(1234-5678-9123) |
| 1 | H(110-130, 50-70) | E(0.57) | H(50-60) | E(0.7) | H(Ricard) | H(1234-5678-9123) |
| 1 | H(90-130, 50-90) | E(0.65) | H(40-60) | E(0.77) | H(Ricard) | H(1234-5678-9123) |
| 1 | H(90-170, 10-90) | E(0.49) | H(40-100) | E(0.57) | H(Ricard) | H(1234-5678-9123) |
| 2 | H(10-30, 10-30) | E(0.97) | H(40-50) | E(0.97) | H(George) | H(5678-9123-4567) |
| 2 | H(10-50, 10-50) | E(0.88) | H(40-60) | E(0.97) | H(George) | H(5678-9123-4567) |
| 2 | H(10-90, 10-90) | E(0.71) | H(40-100) | E(0.77) | H(George) | H(5678-9123-4567) |
| 2 | H(10-30, 10-30) | E(0.97) | H(40-50) | E(0.97) | H(George) | H(5678-9123-4567) |
| 2 | H(10-50, 10-50) | E(0.88) | H(40-60) | E(0.97) | H(George) | H(5678-9123-4567) |

CLIENT 1 DATASET

| ID | LAT/LONG | SIM | AGE | SIM | NAME | CC |
|---|---|---|---|---|---|---|
| 1 | H(50-70, 70-90) | E(0.95) | H(20-30) | E(0.98) | H(Richard) | H(1234-5678-9123) |
| 1 | H(50-90, 50-90) | E(0.86) | H(20-40) | E(0.97) | H(Richard) | H(1234-5678-9123) |
| 1 | H(10-90, 10-90) | E(0.77) | H(0-40) | E(0.93) | H(Richard) | H(1234-5678-9123) |
| 2 | H(110-130, 50-70) | E(0.37) | H(50-60) | E(0.63) | H(George) | H(4567-5678-9123) |
| 2 | H(90-130, 50-90) | E(0.46) | H(40-60) | E(0.68) | H(George) | H(4567-5678-9123) |
| 2 | H(90-170, 10-90) | E(0.29) | H(40-100) | E(0.48) | H(George) | H(4567-5678-9123) |
| 2 | H(30-50, 110-130) | E(0.93) | H(10-20) | E(0.97) | H(George) | H(4567-5678-9123) |
| 2 | H(10-50, 90-130) | E(0.98) | H(0-20) | E(0.92) | H(George) | H(4567-5678-9123) |
| 2 | H(10-90, 90-170) | E(0.84) | H(0-40) | E(0.98) | H(George) | H(4567-5678-9123) |
| 2 | H(10-90, 10-90) | E(0.22) | H(40-100) | E(0.48) | H(George) | H(4567-5678-9123) |
| 2 | H(110-130, 50-70) | E(0.37) | H(50-60) | E(0.63) | H(George) | H(4567-5678-9123) |

CLIENT 2 DATASET

ENABLING APPROXIMATE LINKAGE OF DATASETS OVER QUASI-IDENTIFIERS

BACKGROUND

The present application relates generally to an improved data processing apparatus and method and more specifically to mechanisms for enabling approximate linkage of datasets over encrypted quasi-identifiers.

Data privacy is the relationship between the collection and dissemination of data, technology, the public expectation of privacy, and the legal and political issues surrounding them. Data privacy is challenging since it attempts to use data at a maximum (achievable) level of utility, while protecting an individual's privacy preferences and personally identifiable information. The fields of computer security, data security, and information security all design and use software, hardware, and human resources to address this issue.

SUMMARY

This Summary is provided to introduce a selection of concepts in a simplified form that are further described herein in the Detailed Description. This Summary is not intended to identify key factors or essential features of the claimed subject matter, nor is it intended to be used to limit the scope of the claimed subject matter.

In one illustrative embodiment, a method is provided in a data processing system of a first client, for approximate linkage of datasets over quasi-identifiers. The method comprises receiving a generalization logic data structure representing sets of values for each quasi-identifier in a first dataset of the first client. The method further comprises for each record in the first dataset: generating at least one generalization of a value of a given quasi-identifier in the first dataset based on a selected generalization logic data structure corresponding to the given quasi-identifier, wherein each generalization within the at least one generalization comprises an obfuscated value set/similarity score pair; and generating a generalized record for each of the at least one generalization to form a first generalized dataset. The method further comprises sending the first generalized dataset to a semi-trusted third party for approximate linkage of the first dataset with a second dataset of a second client. The method further comprises receiving an approximate join result from the semi-trusted third party. The approximate join result comprises a set of matching pairs of records from the first generalized dataset and records from a second generalized dataset corresponding to the second dataset of the second client. The method further comprises performing post-processing on the approximate join result and determining a final linkage result based on the post-processing.

In other illustrative embodiments, a computer program product comprising a computer useable or readable medium having a computer readable program is provided. The computer readable program, when executed on a computing device, causes the computing device to perform various ones of, and combinations of, the operations outlined above with regard to the method illustrative embodiment.

In yet another illustrative embodiment, a system/apparatus is provided. The system/apparatus may comprise one or more processors and a memory coupled to the one or more processors. The memory may comprise instructions which, when executed by the one or more processors, cause the one or more processors to perform various ones of, and combinations of, the operations outlined above with regard to the method illustrative embodiment.

These and other features and advantages of the present invention will be described in, or will become apparent to those of ordinary skill in the art in view of, the following detailed description of the example embodiments of the present invention.

BRIEF DESCRIPTION OF THE DRAWINGS

The invention, as well as a preferred mode of use and further objectives and advantages thereof, will best be understood by reference to the following detailed description of illustrative embodiments when read in conjunction with the accompanying drawings, wherein:

FIG. 10 illustrates sending the hashed and encrypted data pairs to the semi-trusted third party in accordance with an illustrative embodiment;

FIG. 11 illustrates performing approximate record linkage using selected common attributes among the to-be-linked datasets in accordance with an illustrated embodiment;

DETAILED DESCRIPTION

Figure 1:
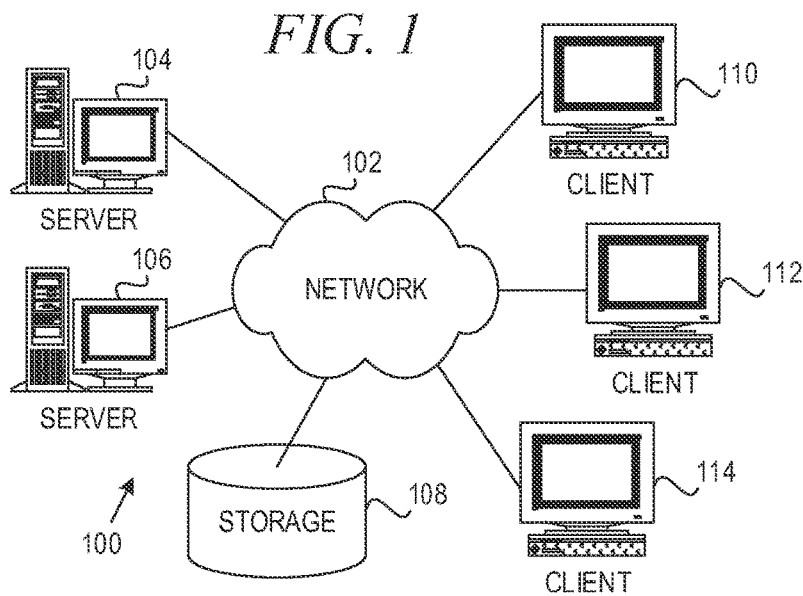
FIG. 1 is an example diagram of a distributed data processing system in which aspects of the illustrative embodiments may be implemented.

There is an abundance of person-specific datasets collected and held at various organizations, such as customer records held by companies. Such data can be an invaluable resource in supporting multiple types of analyses, especially if combined with other datasets, which may be external to the hosting organization, to augment data records with additional characteristics and attributes. Performing such data linkages, however, is computationally costly and requires solving serious privacy challenges, as the processing of person-specific data must adhere to privacy legislation. There are numerous privacy legal frameworks worldwide that govern different types of personal data and provide requirements for their lawful processing.

Person-specific datasets consist of three main types of attributes: direct identifiers (e.g., name, social security number (SSN), phone number, patient identifier, etc.); quasi-identifiers (e.g., date of birth, gender, zip code, marital status, etc.); and non-identifiers. Among these types of identifiers, direct identifiers and quasi-identifiers pose serious re-identification threat to individuals and must be protected prior to the data leaving the hosting organizations.

The easiest way to protect direct and quasi-identifiers in a dataset is to suppress them. This, however, incurs an enormous cost to data utility and practically renders the data useless for any analytic purposes as quasi-identifiers are very important in data analyses. Moreover, it does not leave enough information to the data records to enable their linkage with records of other datasets. In order to protect the identifiers while allowing for record linkage, the approach of hashing has been proposed. Applying a one-way hash function to a data value leads to a seemingly random value that is unique. The same input value to a one-way hash function always produces the same output value, but close-by/similar input values typically lead to quite different output values. When state-of-the-art one-way hashing algorithms are used, this operation is mathematically proven to be almost irreversible with modern computing techniques. In other words, there is no function that can take the output of a one-way hash function to produce the input value.

Simply hashing both direct and quasi-identifiers of a dataset and using the hashed values to link the records to those of another dataset—also with hashed values for the direct and quasi-identifiers—is bound to lead to poor linkage accuracy. This is because of the following:

Standardization issues (e.g., an attribute Name in one dataset containing "first name" followed by "last name" and in another dataset being "last name" followed by "first name," or a phone number that is provided in an international format in one dataset and in a United States format in another dataset);

Schema related issues (e.g., in one dataset there is an attribute First Name and an attribute Last Name, and in the other dataset there is one attribute Name (containing both the first and last name of a person));

Typographical errors (even one-character difference will produce a totally different hash output value); and Noisy data values (e.g., location coordinates).

Approaches have been proposed in the prior art for dealing with standardization issues, and data dictionaries can be used to help deal with schema related issues. Typographical errors can be mitigated using an n-grams approach. The illustrative embodiments assume that the above issues are tackled using state-of-the-art approaches. The illustrative embodiments focus on the problem caused by noisy data. Specifically, the illustrative embodiments focus on the protection of quasi-identifiers and address the following challenges: i) privacy offered when hashing quasi-identifiers, ii) quality of linkage achieved using hashed quasi-identifiers, iii) trust placed in a third party to perform linkage of two datasets whose values for direct and quasi-identifiers have been hashed.

Contrary to direct identifiers, quasi-identifiers typically have a small domain of values (e.g., gender, city, country, zip code, etc.), which are shared by many records; this makes them highly vulnerable to rainbow attacks. In rainbow attacks, the recipient of the data has pre-hashed many values for each popular quasi-identifier (QID) attribute, aiming to collect the hash value corresponding to almost every value of the limited domain of values of a QID attribute. For example, in the case of gender, the recipient of the data can calculate the one-way hash value for "Male" and that for "Female" and then compare it to the one shown in the received data. A solution to rainbow attacks is to use a hashing and salting, leading to different values produced by each data owner for the same input value due to the salt; the salt, however, must be removed prior to matching the records, hence salting does not offer an additional layer of protection when data linkage must be supported.

Assuming that the privacy offered when hashing QIDs is not a concern, achieving accurate linkage using hashed QID values is also problematic. This is because of the following two reasons:

Small differences in input value: For example, assume that latitude and longitude are recorded in two attributes of the data in each of the two datasets to be linked. Two locations may be very close to each other (e.g., in the same building) and still be represented with different values for longitude and latitude in the two datasets. The record linkage algorithm will not be able to link these records based on latitude/longitude information.

Differences in the granularity of the input value: For example, location information may be represented at different granularity at different datasets, such as a street address, a neighborhood, a zip code, a city, etc. Such data may not be linked with the hashed values of location, simply because different hash values will be produced. Inclusion relations (loc.A☐loc.B) cannot be supported using one-way hashes.

To link datasets, the illustrative embodiments consider the use of a third party that receives the protected datasets from each party, where the direct and quasi-identifiers have been hashed, and performs the linkage, returning a linked dataset. Although the third party can be thought of as trusted (e.g., a large company offering a platform to facilitate the linkage of privacy-protected datasets), the illustrative embodiments reduce to the maximum possible extent the trust placed in this party. Specifically, the illustrative embodiments consider a semi-trusted third party (STTP), also known as an "honest-but-curious" party, that follows the protocol without deviations but is curious to learn sensitive information produced when executing the protocol. The illustrative embodiments use the STTP as a way of collecting data from a number of stakeholders to facilitate their linkage, as well as for its computational power to facilitate the costly linkage operations required for linking Big datasets. The illustrative embodiments do not, however, enable the STTP to re-identify individuals and/or learn any original values of quasi-identifiers from the data.

The illustrative embodiments propose an approximate linkage system for linking datasets over encrypted quasi-identifiers, which enables a number of parties (data owners) to do the following: i) protect datasets locally—containing personal and sensitive information—in a way that supports high-quality approximate data linkage based on quasi-identifying attributes; ii) send/upload datasets to a semi-trusted third party (STTP); iii) have the STTP perform the costly data linkage computations to link the datasets, while not being able to reverse-engineer the protection to find original values of the quasi-identifying attributes; and iv) receive from the STTP information about the data records that were identified as "potentially matching," allowing each party to post-process the data to compute the final linked dataset.

In one embodiment, each customer produces a cryptographic key pair (k1, k2) using an RSA (Rivest-Shamir-Adleman)-like key generation algorithm. Alternatively, a symmetric key is used. In one embodiment, the customer uses a one-way hash function to hash the direct identifiers in the dataset. Note that the illustrative embodiments are not focused on handling direct identifiers.

Each customer receives from a server/STTP a generalization logic data structure for each quasi-identifying attribute in the dataset. The same generalization logic data structures are sent to all customers whose dataset contains the same attributes. Alternatively, customers may provide generalization logic data structures to the STTP to be distributed among all parties that wish to link to their datasets. For each QID and for each value of the QID in the dataset, each customer uses the corresponding generalization logic data structure provided by the STTP to select a number of sets of values that depict value generalizations for the particular value in the dataset. In one example embodiment, this process can be automated as follows: at each customer site, an algorithm can be executed to derive the original values of each QID attribute that exists in the customer data and select the corresponding nodes in the corresponding QID generalization logic data structure (set S), alongside some other/additional nodes that are higher in the generalization logic data structure than the selected sets of values (i.e., nodes that belong to the path from selected nodes in a hierarchy S to the root of the hierarchy). In many cases, the generalization data structure is represented as a hierarchy of nodes. In the description of the illustrative embodiments that follows, the generalization logic data structure is referred to as a hierarchy of nodes; however, in alternative embodiments and for different quasi-identifiers, the generalization logic data structure may take different forms.

The customer computes the hash of the corresponding value in the generalization data structure and associates it with a similarity score depicting how similar the value is to the generalization. This hash may be a salted hash, where the salt has been agreed upon by the customers who participate in the data linkage protocol. Also, for each QID and for each value of the QID in the dataset, each customer uses the corresponding generalization logic data structure sent by the STTP to select a number of other non-similar nodes (to the original data value) from the generalization logic data structure, hash these generalizations and associate each of these generalizations with a low similarity score. The selection of non-similar nodes can be performed automatically by having the algorithm (discussed above) select some nodes that do not belong to a path from S to the root of the hierarchy. A low similarity score below a predetermined threshold would be deemed too low to consider a match (e.g., <0.1). Following these steps, a list of pairs of the form (hashed-hierarchy-node, similarity-score) is associated with each original data value of a QID.

For each similarity score (SS) associated with a hashed value in a (hashed-hierarchy-node, similarity-score) pair, the data owner encrypts the similarity score using a key. In the example embodiment of RSA-like key generation algorithm, the data owner generates keys k1, k2, encrypts the SS using k1, and only a holder of key k2 can decrypt the value and see the actual similarity score.

Each customer sends their hashed and encrypted dataset to the STTP. As a result, the STTP can see a set of pairs of hashed values and encrypted similarity scores associated with each value of a QID attribute of the customer; however, the STTP cannot tell which nodes are accurate matches and which nodes are noise, and the STTP cannot see any similarity scores to learn how similar the replacement nodes are to the original data values.

While the illustrative embodiments use a hash algorithm to obfuscate values represented by the node in the hierarchy and use an encryption algorithm to obfuscate the similarity scores and direct identifier values, other techniques for obfuscation may be used in each of these instances. For example, in alternative embodiments, the direct identifiers may be obfuscated using a hash function, perturbation, or the like. As another example, the similarity scores may be obfuscated using symmetric encryption in an alternative embodiment.

The STTP performs an approximate record linkage. With respect to the QIDs, the STTP searches for common hash values for the same QID attribute appearing in the datasets by computing the intersection of the two sets {(hashed-hierarchy-node, similarity-score), . . . } with respect to the hash values only (i.e., not the similarity scores). The STTP reports all pairs of (hashed-hierarchy-node, similarity-score) that match and discards the rest. Then, the STTP sends the approximately linked data to the customers.

The customers securely exchange their cryptographic keys to decrypt the similarity scores associated with the hashed hierarchy nodes in each data record. In the example embodiment of RSA-like key generation algorithm, customers exchange their k2 keys. For each data record and QID attribute, the customers keep the (hashed-hierarchy-node, similarity-score) pair that has the maximum similarity score. If this score is below the threshold (e.g., 0.1), then they consider the corresponding attribute as non-matching for the corresponding records.

Each customer needs to perform only one iteration over the potentially matching pairs of records (as provided by the STTP) to compute an overall similarity score for the potentially matching pair, where for the QID attributes it uses the similarity score provided by the most similar pair of (hashed-hierarchy-node, similarity-score) if this is above the threshold, or zero otherwise. If the overall similarity score of a potentially matching pair is high (above another threshold, such as 0.8), then this is considered an accurate record pair match. Otherwise, the pair of records is considered as non-matching and is discarded. The computation of the actually matching pairs is quick, requires a single pass over the data, has low computational and memory complexity, and can be performed at each customer site independently to derive the final linked dataset.

The approach of the illustrative embodiments is highly configurable, enabling each customer to make decisions on the following: i) level of granularity or abstraction they will report a QID value; ii) how many levels of abstraction (in a domain generalization hierarchy) they will associate with an original QID value, enabling for linkage with other datasets where the reported values of the corresponding QIDs may be at a coarser level; and iii) the level of protection offered to the original QID value by tuning the number of noise nodes selected from the corresponding hierarchy to provide as plausible abstractions. A maximum level of protection can be achieved when the data owner selects all of the nodes of the hierarchy to represent an original QID value. In general, there is a balance between level of protection and computational cost that the STTP and the customers must pay to derive the actual matching records.

Before beginning the discussion of the various aspects of the illustrative embodiments and the improved computer operations performed by the illustrative embodiments, it should first be appreciated that throughout this description the term "mechanism" will be used to refer to elements of the present invention that perform various operations, functions, and the like. A "mechanism," as the term is used herein, may be an implementation of the functions or aspects of the illustrative embodiments in the form of an apparatus, a procedure, or a computer program product. In the case of a procedure, the procedure is implemented by one or more devices, apparatus, computers, data processing systems, or the like. In the case of a computer program product, the logic represented by computer code or instructions embodied in or on the computer program product is executed by one or more hardware devices in order to implement the functionality or perform the operations associated with the specific "mechanism." Thus, the mechanisms described herein may be implemented as specialized hardware, software executing on hardware to thereby configure the hardware to implement the specialized functionality of the present invention which the hardware would not otherwise be able to perform, software instructions stored on a medium such that the instructions are readily executable by hardware to thereby specifically configure the hardware to perform the recited functionality and specific computer operations described herein, a procedure or method for executing the functions, or a combination of any of the above.

The present description and claims may make use of the terms "a", "at least one of", and "one or more of" with regard to particular features and elements of the illustrative embodiments. It should be appreciated that these terms and phrases are intended to state that there is at least one of the particular feature or element present in the particular illustrative embodiment, but that more than one can also be present. That is, these terms/phrases are not intended to limit the description or claims to a single feature/element being present or require that a plurality of such features/elements be present. To the contrary, these terms/phrases only require at least a single feature/element with the possibility of a plurality of such features/elements being within the scope of the description and claims.

Moreover, it should be appreciated that the use of the term "engine," if used herein with regard to describing embodiments and features of the invention, is not intended to be limiting of any particular implementation for accomplishing and/or performing the actions, steps, processes, etc., attributable to and/or performed by the engine. An engine may be, but is not limited to, software executing on computer hardware, specialized computer hardware and/or firmware, or any combination thereof that performs the specified functions including, but not limited to, any use of a general and/or specialized processor in combination with appropriate software loaded or stored in a machine readable memory and executed by the processor to thereby specifically configure the processor to perform the specific functions of the illustrative embodiments. Further, any name associated with a particular engine is, unless otherwise specified, for purposes of convenience of reference and not intended to be limiting to a specific implementation. Additionally, any functionality attributed to an engine may be equally performed by multiple engines, incorporated into and/or combined with the functionality of another engine of the same or different type, or distributed across one or more engines of various configurations.

In addition, it should be appreciated that the following description uses a plurality of various examples for various elements of the illustrative embodiments to further illustrate example implementations of the illustrative embodiments and to aid in the understanding of the mechanisms of the illustrative embodiments. These examples intended to be non-limiting and are not exhaustive of the various possibilities for implementing the mechanisms of the illustrative embodiments. It will be apparent to those of ordinary skill in the art in view of the present description that there are many other alternative implementations for these various elements that may be utilized in addition to, or in replacement of, the examples provided herein without departing from the spirit and scope of the present invention.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 2:
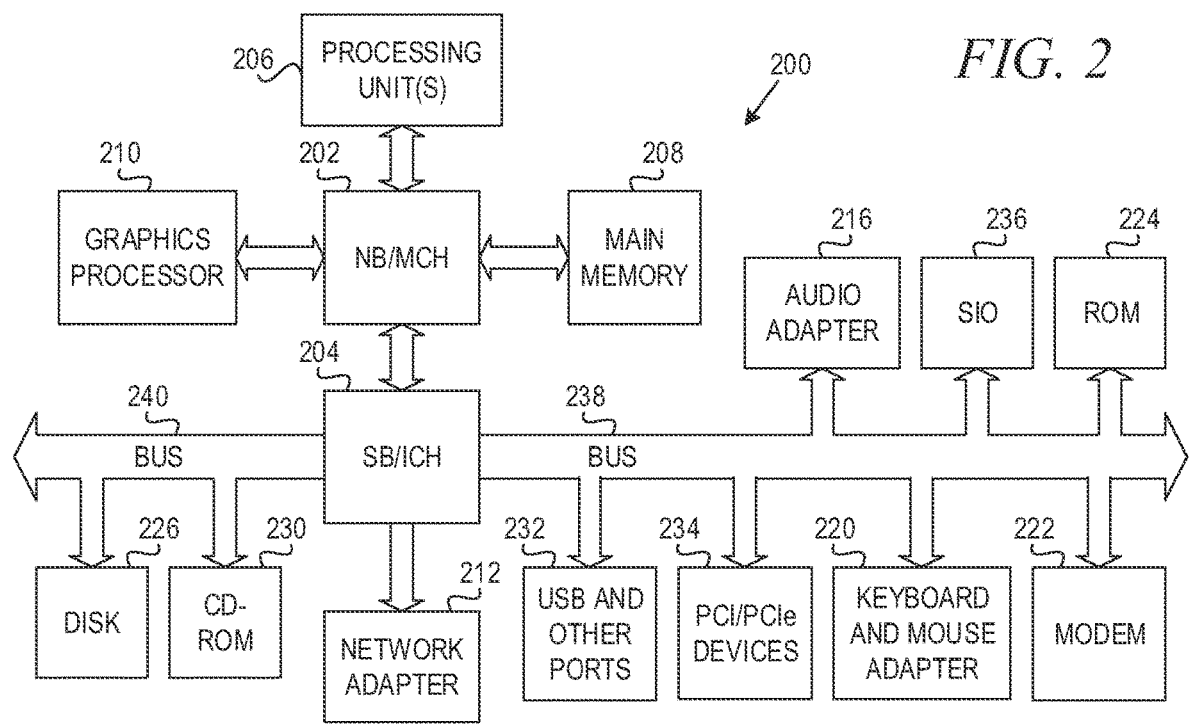
FIG. 2 is an example block diagram of a computing device in which aspects of the illustrative embodiments may be implemented.

The illustrative embodiments may be utilized in many different types of data processing environments. In order to provide a context for the description of the specific elements and functionality of the illustrative embodiments, FIGS. 1 and 2 are provided hereafter as example environments in which aspects of the illustrative embodiments may be implemented. It should be appreciated that FIGS. 1 and 2 are only examples and are not intended to assert or imply any limitation with regard to the environments in which aspects or embodiments of the present invention may be implemented. Many modifications to the depicted environments may be made without departing from the spirit and scope of the present invention.

FIG. 1 depicts a pictorial representation of an example distributed data processing system in which aspects of the illustrative embodiments may be implemented. Distributed data processing system 100 may include a network of computers in which aspects of the illustrative embodiments may be implemented. The distributed data processing system 100 contains at least one network 102, which is the medium used to provide communication links between various devices and computers connected together within distributed data processing system 100. The network 102 may include connections, such as wire, wireless communication links, or fiber optic cables.

In the depicted example, server 104 and server 106 are connected to network 102 along with storage unit 108. In addition, clients 110, 112, and 114 are also connected to network 102. These clients 110, 112, and 114 may be, for example, personal computers, network computers, or the like. In the depicted example, server 104 provides data, such as boot files, operating system images, and applications to the clients 110, 112, and 114. Clients 110, 112, and 114 are clients to server 104 in the depicted example. Distributed data processing system 100 may include additional servers, clients, and other devices not shown.

In the depicted example, distributed data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational, and other computer systems that route data and messages. Of course, the distributed data processing system 100 may also be implemented to include a number of different types of networks, such as for example, an intranet, a local area network (LAN), a wide area network (WAN), or the like. As stated above, FIG. 1 is intended as an example, not as an architectural limitation for different embodiments of the present invention, and therefore, the particular elements shown in FIG. 1 should not be considered limiting with regard to the environments in which the illustrative embodiments of the present invention may be implemented.

As shown in FIG. 1, one or more of the computing devices, e.g., server 104, may be specifically configured to implement an approximate linkage system for linking datasets over encrypted quasi-identifiers. The configuring of the computing device may comprise the providing of application specific hardware, firmware, or the like to facilitate the performance of the operations and generation of the outputs described herein with regard to the illustrative embodiments. The configuring of the computing device may also, or alternatively, comprise the providing of software applications stored in one or more storage devices and loaded into memory of a computing device, such as server 104, for causing one or more hardware processors of the computing device to execute the software applications that configure the processors to perform the operations and generate the outputs described herein with regard to the illustrative embodiments. Moreover, any combination of application specific hardware, firmware, software applications executed on hardware, or the like, may be used without departing from the spirit and scope of the illustrative embodiments.

It should be appreciated that once the computing device is configured in one of these ways, the computing device becomes a specialized computing device specifically configured to implement the mechanisms of the illustrative embodiments and is not a general-purpose computing device. Moreover, as described hereafter, the implementation of the mechanisms of the illustrative embodiments improves the functionality of the computing device and provides a useful and concrete result that facilitates linking datasets over encrypted quasi-identifiers.

These computing devices, or data processing systems, may comprise various hardware elements which are specifically configured, either through hardware configuration, software configuration, or a combination of hardware and software configuration, to implement one or more of the systems/subsystems described herein. FIG. 2 is a block diagram of just one example data processing system in which aspects of the illustrative embodiments may be implemented. Data processing system 200 is an example of a computer, such as server 104 in FIG. 1, in which computer usable code or instructions implementing the processes and aspects of the illustrative embodiments of the present invention may be located and/or executed so as to achieve the operation, output, and external effects of the illustrative embodiments as described herein.

In the depicted example, data processing system 200 employs a hub architecture including north bridge and memory controller hub (NB/MCH) 202 and south bridge and input/output (I/O) controller hub (SB/ICH) 204. Processing unit 206, main memory 208, and graphics processor 210 are connected to NB/MCH 202. Graphics processor 210 may be connected to NB/MCH 202 through an accelerated graphics port (AGP).

In the depicted example, local area network (LAN) adapter 212 connects to SB/ICH 204. Audio adapter 216, keyboard and mouse adapter 220, modem 222, read only memory (ROM) 224, hard disk drive (HDD) 226, CD-ROM drive 230, universal serial bus (USB) ports and other communication ports 232, and PCI/PCIe devices 234 connect to SB/ICH 204 through bus 238 and bus 240. PCI/PCIe devices may include, for example, Ethernet adapters, add-in cards, and PC cards for notebook computers. PCI uses a card bus controller, while PCIe does not. ROM 224 may be, for example, a flash basic input/output system (BIOS).

HDD 226 and CD-ROM drive 230 connect to SB/ICH 204 through bus 240. HDD 226 and CD-ROM drive 230 may use, for example, an integrated drive electronics (IDE) or serial advanced technology attachment (SATA) interface. Super I/O (SIO) device 236 may be connected to SB/ICH 204.

An operating system runs on processing unit 206. The operating system coordinates and provides control of various components within the data processing system 200 in FIG. 2. As a client, such as a customer with datasets to be linked with datasets of other customers, the operating system may be a commercially available operating system such as Microsoft® Windows 10®. An object-oriented programming system, such as the Java™ programming system, may run in conjunction with the operating system and provides calls to the operating system from Java™ programs or applications executing on data processing system 200.

As a server, such as a semi-trusted third party (STTP) performing approximate linkage of datasets over encrypted quasi-identifiers, data processing system 200 may be, for example, an IBM eServer™ System p® computer system, Power™ processor-based computer system, or the like, running the Advanced Interactive Executive (AIX®) operating system or the LINUX® operating system. Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as HDD 226, and may be loaded into main memory 208 for execution by processing unit 206. The processes for illustrative embodiments of the present invention may be performed by processing unit 206 using computer usable program code, which may be located in a memory such as, for example, main memory 208, ROM 224, or in one or more peripheral devices 226 and 230, for example.

A bus system, such as bus 238 or bus 240 as shown in FIG. 2, may be comprised of one or more buses. Of course, the bus system may be implemented using any type of communication fabric or architecture that provides for a transfer of data between different components or devices attached to the fabric or architecture. A communication unit, such as modem 222 or network adapter 212 of FIG. 2, may include one or more devices used to transmit and receive data. A memory may be, for example, main memory 208, ROM 224, or a cache such as found in NB/MCH 202 in FIG. 2.

As mentioned above, in some illustrative embodiments the mechanisms of the illustrative embodiments may be implemented as application specific hardware, firmware, or the like, application software stored in a storage device, such as HDD 226 and loaded into memory, such as main memory 208, for executed by one or more hardware processors, such as processing unit 206, or the like. As such, the computing device shown in FIG. 2 becomes specifically configured to implement the mechanisms of the illustrative embodiments and specifically configured to perform the operations and generate the outputs described hereafter with regard to an approximate linkage system for linking datasets over encrypted quasi-identifiers.

Those of ordinary skill in the art will appreciate that the hardware in FIGS. 1 and 2 may vary depending on the implementation. Other internal hardware or peripheral devices, such as flash memory, equivalent non-volatile memory, or optical disk drives and the like, may be used in addition to or in place of the hardware depicted in FIGS. 1 and 2. Also, the processes of the illustrative embodiments may be applied to a multiprocessor data processing system, other than the SMP system mentioned previously, without departing from the spirit and scope of the present invention.

Moreover, the data processing system 200 may take the form of any of a number of different data processing systems including client computing devices, server computing devices, a tablet computer, laptop computer, telephone or other communication device, a personal digital assistant (PDA), or the like. In some illustrative examples, data processing system 200 may be a portable computing device that is configured with flash memory to provide non-volatile memory for storing operating system files and/or user-generated data, for example. Essentially, data processing system 200 may be any known or later developed data processing system without architectural limitation.

Figure 3:
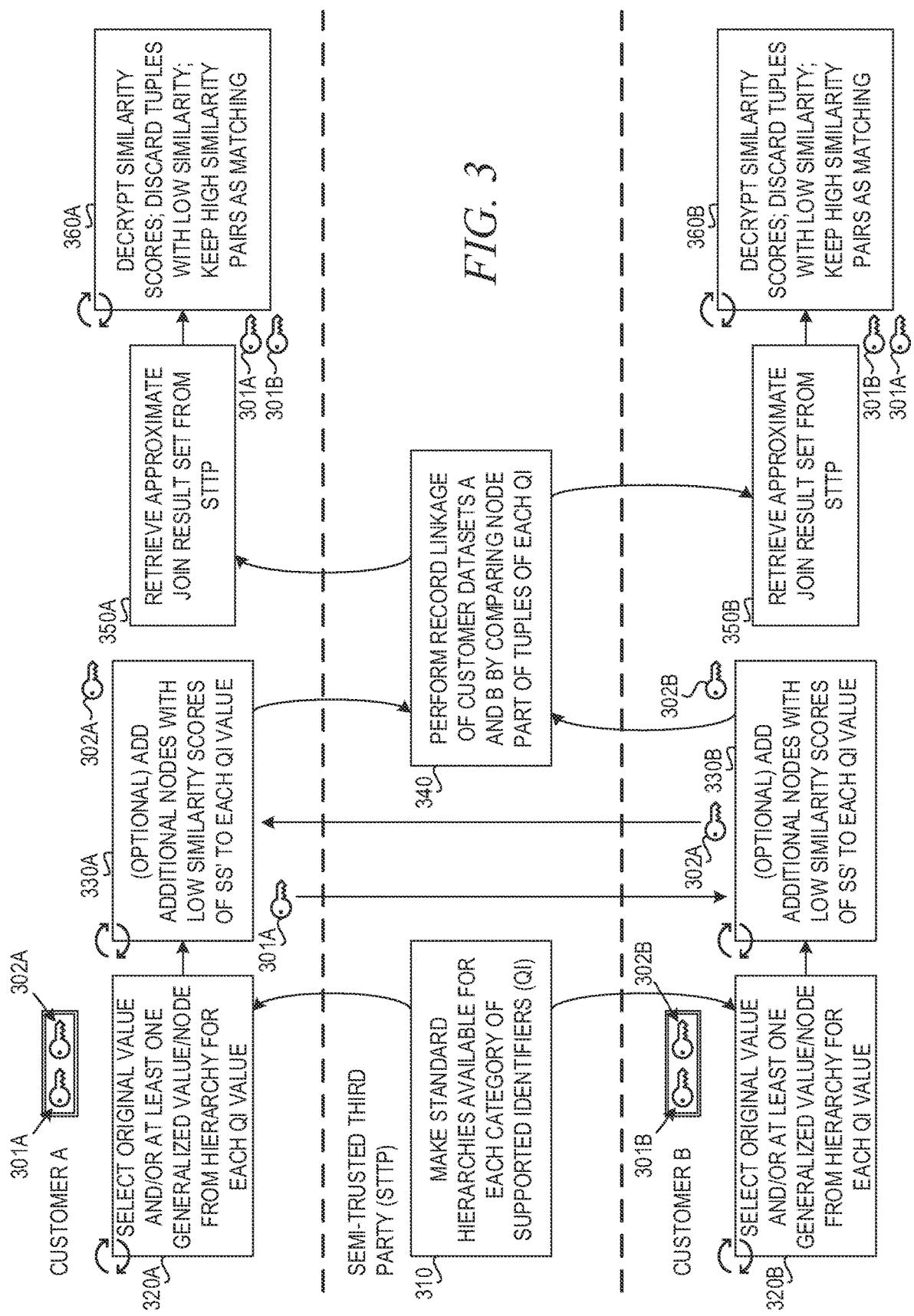
FIG. 3 is a block diagram of an approximate linkage system for linking datasets over encrypted quasi-identifiers in accordance with an illustrative embodiment.

FIG. 3 is a block diagram of an approximate linkage system for linking datasets over encrypted quasi-identifiers in accordance with an illustrative embodiment. Customer A and customer B are customers at client data processing systems, such as clients 110, 112, 114 in FIG. 1, that are attempting to link datasets. Semi-trusted third party (STTP) is a party that offers approximate linkage of datasets for customer A and customer B. The activities of the STTP may be executed on a server, such as server 104, 106 of FIG. 1.

Customer A generates a public key 301A and a private key 302A pair, and customer B generates a public key 301B and a private key 302B pair. The public key and the private key are generated together and form a key pair. This is important as the two keys should be generated by the same process in order to be matching each other. Customer A and customer B exchange public keys; therefore, customer A sends public key 301A to customer B, and customer B sends public key 301B to customer A. The clients generate and exchange keys for encrypting and decrypting similarity scores. These keys may follow any encryption standard that meets the security requirements of the users. The same key could also be used by both clients if this meets their security requirements. The exchange of keys can be accomplished through any secure means of sharing information and is outside the scope of the illustrative embodiments. The exchange can occur at any time before the similarity scores are encrypted, as will be described in further detail below.

Figure 4A:
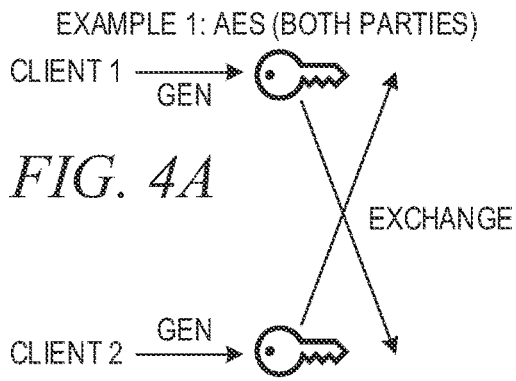
FIGS. 4A-4C illustrate examples of encryption exchange techniques that may be used in the illustrative embodiment.
Figure 4B:
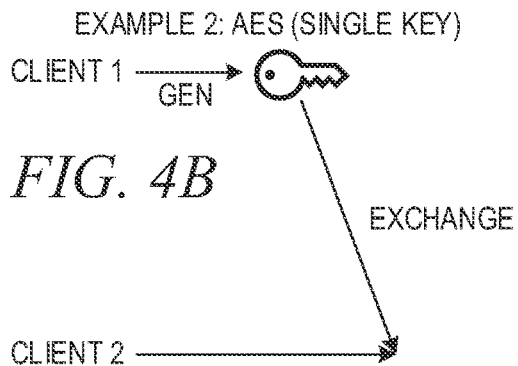
Figure 4C:
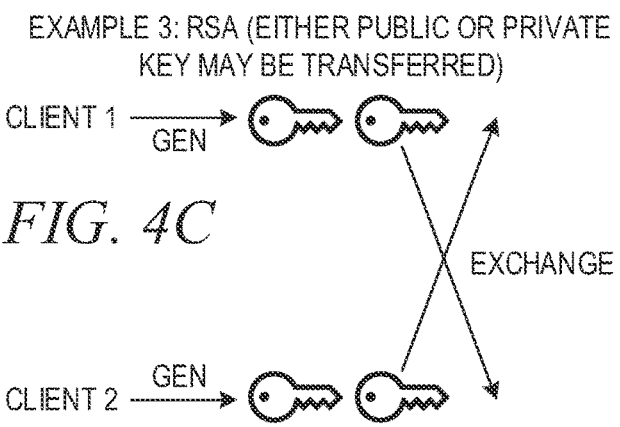

In the depicted example, the customers of the approximate linkage system use an RSA-like encryption algorithm; however, other encryption algorithms may be used within the spirit and scope of the illustrative embodiment. FIGS. 4A-4C illustrate examples of encryption exchange techniques that may be used in the illustrative embodiment. FIG. 4A illustrates a first example in which both parties exchange a single key in accordance with the Advance Encryption Standard (AES) encryption specification. In this example, client 1 generates a first key, client 2 generates a second key, and the clients exchange their keys. FIG. 4B illustrates a second example in which one party, client 1, generates a key and exchanges this key with the other party, client 2. This is a single-key implementation of the AES encryption specification. FIG. 4C illustrates a third example of an RSA encryption specification in which either a public or private key may be transferred. In this example, client 1 generates two keys (public key and private key) and client 2 generates two keys (public key and private key), and the clients exchange their public keys. Data encrypted by client 1 using the private key can be decrypted by client 2 using the public key of client 1, and data encrypted by client 2 using that client's private key can be decrypted by client 1 using the public key of client 2.

Returning to FIG. 3, the semi-trusted third party makes standard hierarchies available for each category of supported identifiers (block 310). The hierarchies of quasi-identifying attribute values allow comparisons of data nodes across generalization levels. The hierarchies of quasi-identifying attributes are described in further detail below with reference to FIG. 5.

Customer A selects the original value and at least one generalized value or node from the corresponding hierarchy for each QID value (block 320A). Customer B selects the original value and at least one generalized value or node from the corresponding hierarchy for each QID value (block 320B). For a given QID value, customer A and customer B determine nodes in the corresponding hierarchy that contain the QID value and calculate a similarity score (SS) representing how "similar" the QID value is to the range of values represented by the node. Customer A and customer B then forms a list of <node, similarity-score> pairs (tuples) for each QID. The selection of values and generalization are described in further detail below with reference to FIG. 7.

Optionally, customer A adds additional nodes with low similarity scores SS' to each QID value in the dataset of customer A (block 330A), and customer B adds additional nodes with low similarity scores SS' to each QID value in the dataset of customer B (block 330B). Customer A and customer B then hash the nodes and encrypt the similarity scores, forming pairs (tuples) of the form <Hash(node), Encr(similarity-score)>. Customer A encrypts similarity scores using private key 302A, and customer B encrypts similarity scores using private key 302B. Customer A and customer B send their datasets to STTP for approximate linkage of the datasets. The addition of nodes with low similarity scores is described in further detail below with reference to FIG. 8.

The STTP performs record linkage of the customer datasets by comparing the node part of the tuples of each QID (block 340). The STTP computes pairs of potentially matching records, along with their attributes, which is an approximate join of the datasets. The STTP cannot learn or see the similarity scores. The STTP provides the potentially matching records and their matched tuples for each QID to customer A and customer B. The approximate record linkage is described in further detail below with reference to FIG. 11.

Customer A retrieves the approximate join result set from the STTP (block 350A). For each QID value, customer A decrypts the similarity score of each tuple, discards tuples with similarity scored below a predetermined threshold, computes an overall similarity of the record pair, and keeps the record pair as matching if the overall similarity is above a threshold (block 360A). Customer A uses public key 301A and public key 301B of customer B to decrypt the similarity scores. Customer B retrieves the approximate join result set from the STTP (block 350B). For each QID value, customer B decrypts the similarity score of each tuple, discards tuples with a similarity score below a predetermined threshold, computes an overall similarity of the record pair, and keeps the record pair as matching if the overall similarity is above a threshold (block 360B). Customer B uses public key 301B and public key 301A of customer A to decrypt the similarity scores. This post-processing of blocks 360A and 360B requires only one efficient pass over the entire dataset. The post-processing of blocks 360A and 360B are described in further detail below with reference to FIG. 12.

Figure 5:
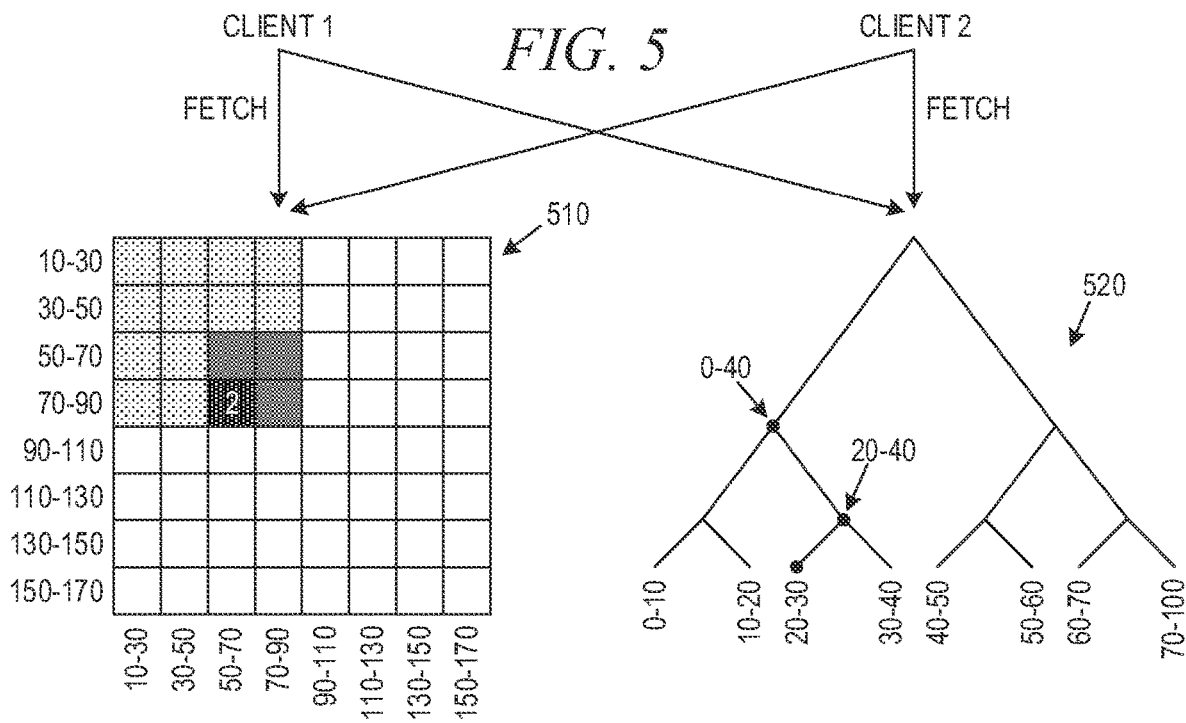
FIG. 5 depicts hierarchies of quasi-identifying data in accordance with an illustrative embodiment.

FIG. 5 depicts hierarchies of quasi-identifying data in accordance with an illustrative embodiment. The STTP server hosts or otherwise makes available to the clients a set of hierarchies, each representing possible values (the domain) of a data attribute, upon which records will be linked. Client 1 and client 2 fetch hierarchies 510, 520 from the STTP for preparing the datasets for approximate linking.

Each of these hierarchies has multiple levels of generalization/abstraction for each possible value of the corresponding attribute. For example, a hierarchy representing age should span all possible ages, e.g., [0,100]. A hierarchy representing location should span all possible positions, etc.

The hierarchies may be n-dimensional, depending on the type of data they represent. For example, the location hierarchy 510 is two-dimensional, while the age hierarchy 520 is single dimensional. Location hierarchy 510 spans locations in the input data, and age hierarchy 520 spans ages in the input data. In these examples, the minimum and maximum values are selected to make a smaller chart for display purposes.

Figures 6, 7:
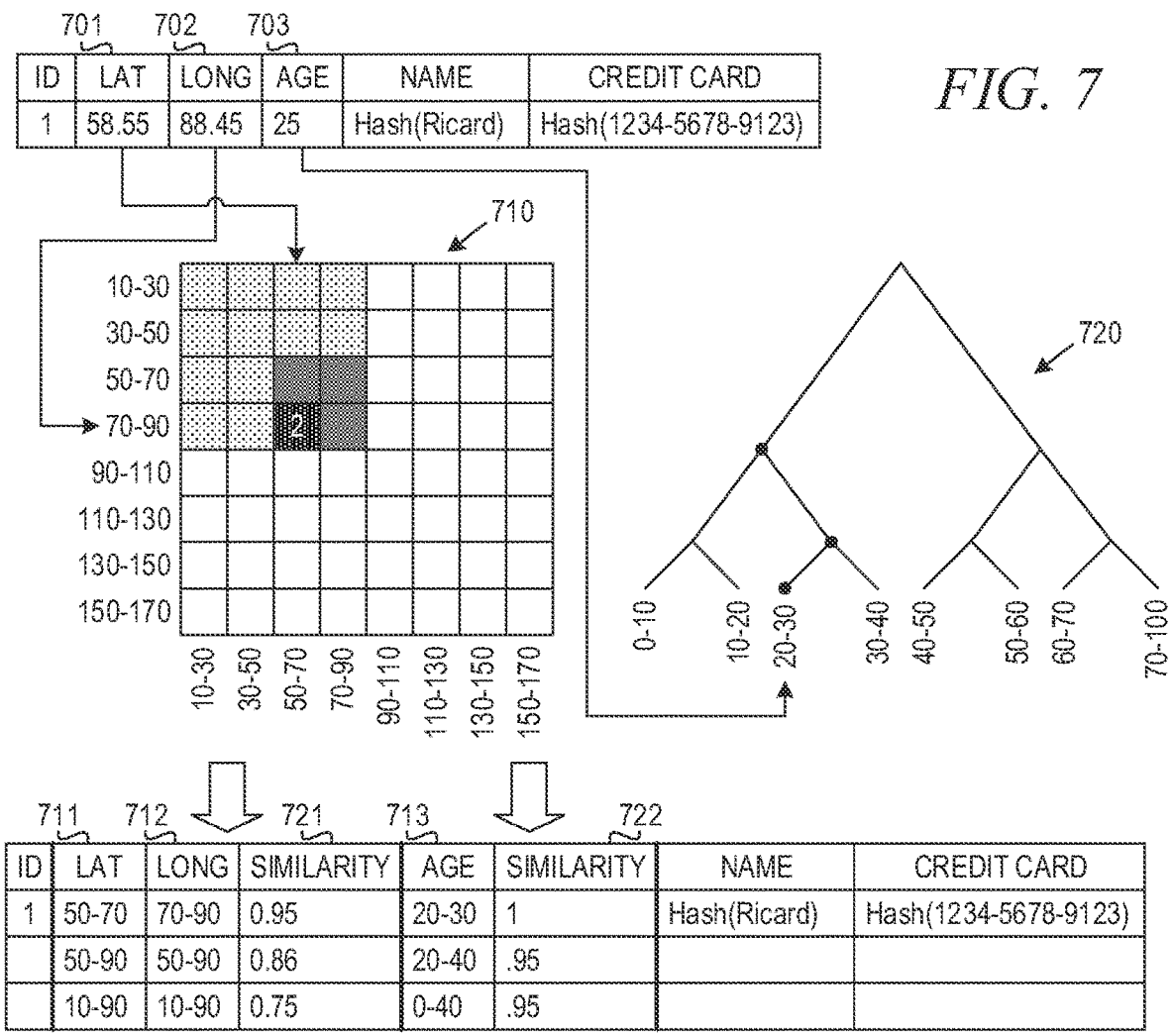
FIG. 6 illustrates suppression of direct identifiers in accordance with an illustrative embodiment.
FIG. 7 illustrates mapping each attribute value to at least one hierarchy node in accordance with an illustrative embodiment.

FIG. 6 illustrates suppression of direct identifiers in accordance with an illustrative embodiment. Any direct identifiers (DIs) are removed, masked, or otherwise de-identified. In one embodiment, the original values are hashed before uploading the data to the STTP. In the depicted example, the name values 601 and credit card values 602 are hashed to form hashed values 611, 612. The hash function allows finding direct matches as part of the record linkage process. FIG. 6 illustrates replacing original values with hashes of the original values for two rows of a single dataset. The same process is performed for the dataset of the other client.

FIG. 7 illustrates mapping each attribute value to at least one hierarchy node in accordance with an illustrative embodiment. Each client identifies the attributes (columns) in the dataset that are of interest for the linkage and finds a best fit using the hierarchies supplied by the STTP to as many levels of precision as desired. For each value of a column fit into the hierarchy, a similarity score is generated. Higher values of this score correspond to higher similarity. In this example, the distance between the real point and the median of the generalized are (normalized to a percentage of the entire chart) is used for the score for the location data, and for ages, the distance to the median for that node is used.

In this example, only a single row from a dataset is shown; however, this method applies to all rows in the dataset. In the example shown in FIG. 7, the two-dimensional location hierarchy 710 has columns representing latitude and rows representing longitude. The value for the latitude attribute 701 aligns with the third column with a range of 50-70, and the value for the longitude attribute 702 aligns with the fourth row with a range of 70-90. In addition, the value of the latitude attribute 701 also aligns with the third and fourth columns, which together represent a range of 50-90, and aligns with the first four columns, which together represent a range of 10-90. Similarly, the value of the longitude attribute 702 aligns with the third and fourth rows, which together represent a range of 50-90, and aligns with the first four rows, which together represent a range of 10-90.

In the example shown in FIG. 7, the age hierarchy 720 has a root node representing all possible age values, a next level of nodes representing a lower granularity of age ranges, and leaf nodes representing the lowest granularity of age ranges. The value for the age 703 aligns with node representing a range of 20-30. In addition, the value of the age attribute 703 also aligns with next higher node, which represents a range of 20-40, and aligns with the next higher node, which represents a range of 0-40.

For each node or group of nodes, the client generates a similarity score. In one example embodiment, for the two-dimensional location hierarchy 710, the client calculates the similarity score as follows:

$$SS = 1 - \frac{\sqrt{(NodeLatitudeAverage - \text{Latitude})^2 + (NodeLongitudeAverage - \text{Longitude})^2}}{HierarchySpan}$$

In another example embodiment, for the age hierarchy 720, the client calculates the similarity score as follows:

$$SS = 1 - \frac{NodeAgeAverage - \text{Age}}{HierarchySpan}$$

The client then replaces the latitude value 701 and longitude value 702 with a list of tuples including latitude node range 711, longitude node range 712, and similarity score 721 (<latitude-node, longitude-node, similarity-score>) and replaces the age value 703 with a list of tuples including age node range 713 and similarity score 722 (<age-node, similarity-score>).

Figure 8:
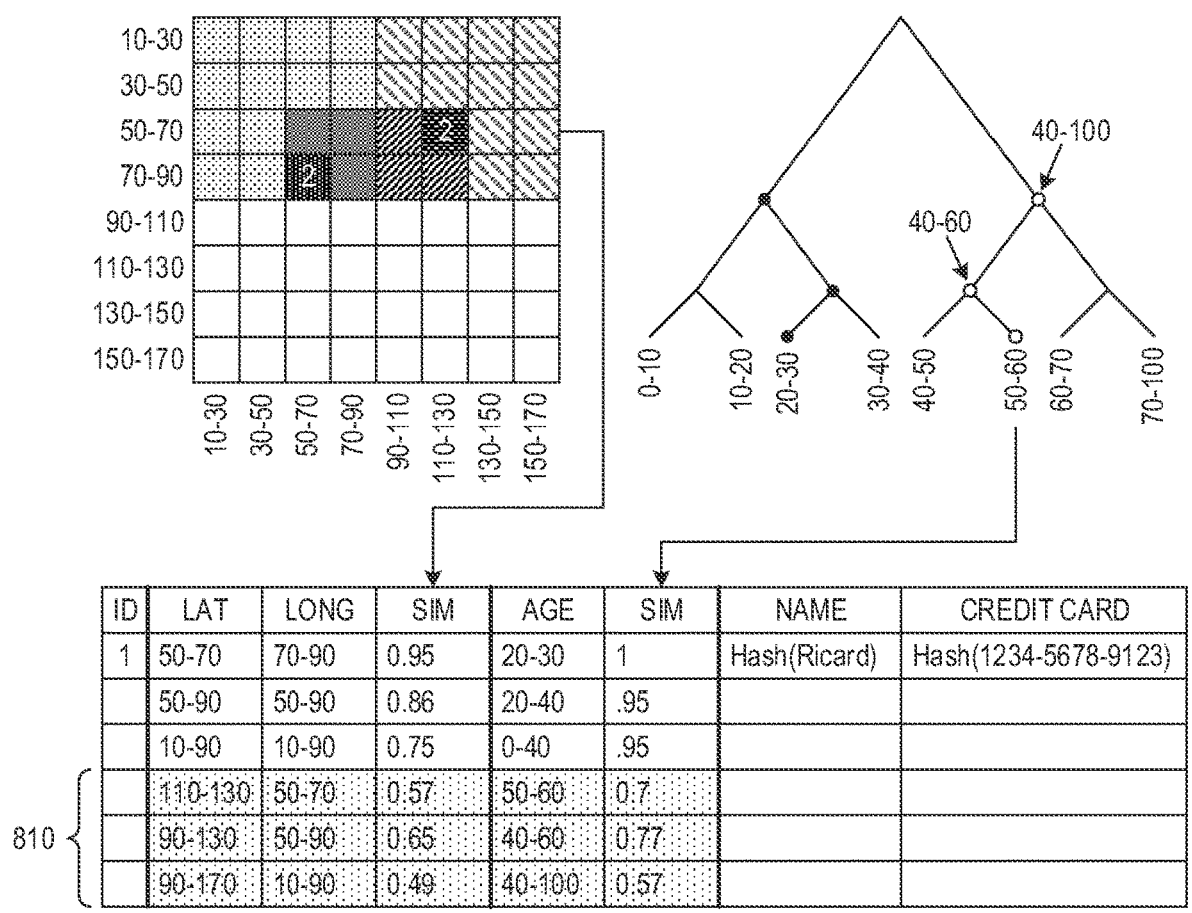
FIG. 8 illustrates adding noise into the dataset in accordance with an illustrative embodiment.

FIG. 8 illustrates adding noise into the dataset in accordance with an illustrative embodiment. The client increases uncertainty by associating dissimilar hierarchy nodes with the original attribute values. Because the hierarchy nodes are hashed and the similarity scores are encrypted, an observer will not know which rows correspond to actual values and which correspond to noise.

Thus, the client may optionally add noise points to the data to selectively reduce the ability of the STTP to deduce any original data values. The more noise added, the less prone the data will be to statistical attacks (e.g., rainbow tables); noise, however, increases processing load for computing the join. On the positive side, the impact on filtering out erroneous matches on the client side is minimal.

Each row generated via the noise is also given a similarity score, in the same way as described above. In the example depicted in FIG. 8, rows 810 are added with node ranges that do not include the QID values. As a result, the node ranges in rows 810 have lower similarity scores.

In one example embodiment, each client may add only a single row with additional nodes from the hierarchy. On the other end of the spectrum, each client may add a row for every node at every level of the hierarchy. The number of added rows will depend on the security requirements, the level of trust placed in the STTP, and the amount of processing cost that can be tolerated.

Figure 9:
FIG. 9 illustrates replacing the quasi-identifying attributes in accordance with an illustrative embodiment.

FIG. 9 illustrates replacing the quasi-identifying attributes in accordance with an illustrative embodiment. Each client hashes the column values for which the client chose a node in the hierarchy, using a predetermined hashing algorithm that is agreed upon by both parties. This is shown for a single row of actual QID values in FIG. 9; however, this is applied to all rows for both clients. In this case, the client combines the latitude and longitude, because the client is interested in the linear distance between two points in two dimensions. Thus, the client replaces the latitude nodes and the longitude nodes with a hash of the combined latitude and longitude nodes 901. The client also replaces the age node with a hash of the age node 902.

Then, the client encrypts the similarity score associated with each hierarchy node, which is associated with the original data attribute value. Each client encrypts all the computed similarity scores with a cryptographic key to form latitude/longitude similarity scores 911 and age similarity scores 912, depending on the encryption scheme agreed upon by the parties. This will prevent decoding of the similarity scores 911, 912 on the STTP machine and, thus, prevent the identification and removal of noise associated with attribute values, except at the client sites, where the client has access to the key needed to decrypt these values.

FIG. 10 illustrates sending the hashed and encrypted data pairs to the semi-trusted third party in accordance with an illustrative embodiment. Client 1 sends client 1 dataset 1010 to semi-trusted third party (STTP) 1030, and client 2 sends client 2 dataset 1020 to STTP 1030. In the example shown in FIG. 10, the client 1 dataset 1010 includes rows for another record, which are generated in the manner described above. Also, the rows of client 2 dataset 1020 were generated in the same manner as those generated for the client 1 dataset 1010.

FIG. 11 illustrates performing approximate record linkage using selected common attributes among the to-be-linked datasets in accordance with an illustrated embodiment. Each selected attribute (direct and quasi-identifiers) of the datasets is compared with that of the other dataset. Any approximate matches are selected. This example represents the linkage as a table join, with the client 1 dataset on the left and the client 2 dataset on the right. However, this can be accomplished using returned sets of linkage scores or other methods.

In one embodiment, the semi-trusted third party (STTP) matches each record on the left side to every record on the right side and applies one or more rules to determine if records match. The rules may be determined by the STTP. In another embodiment, the rules may be agreed upon by the clients. In yet another embodiment, each client may provide its own rules for matching records such that each client may receive a different set of matching records. The rules may specify a number of attributes that must match for the records to be considered a match. Rules may also include rules specific to an attribute. For example, a "Name" attribute rule may specify that the attribute matches if the first two letters of the last name match.

Note that in Row 7, even though the "Name" column is a perfect match, the records are not necessarily linked given the other columns do not match. This row may be removed in the next step depending on the fidelity desired in the linkage.

Matches may be further selected by some form of weighting of the attributes, where a high weight associated with an attribute signifies the importance of the attribute in providing confidence of an actual or correct match. For example, a "Social Security Number" attribute may have a much higher weight than a "Name" attribute, and a "Name" attribute may have a higher weight than a "Credit Card Number" attribute.

In one embodiment, rows that have a minimum of three columns in common are selected and all others may be removed. In the example shown in FIG. 11, Row 1 on the left matches Row 1 on the right, Row 2 on the left matches Row 2 on the right, Row 3 on the left matches Row 3 on the right, and Row 9 on the left matches Row 10 on the right. Note that in the first three rows, the typographical error in the name ("Ricard" vs. "Richard") does not cause the linkage to be lost, because in combination with the other similarities using the approximate linkage of the illustrative embodiment, the rows are considered a match.

Figure 12:
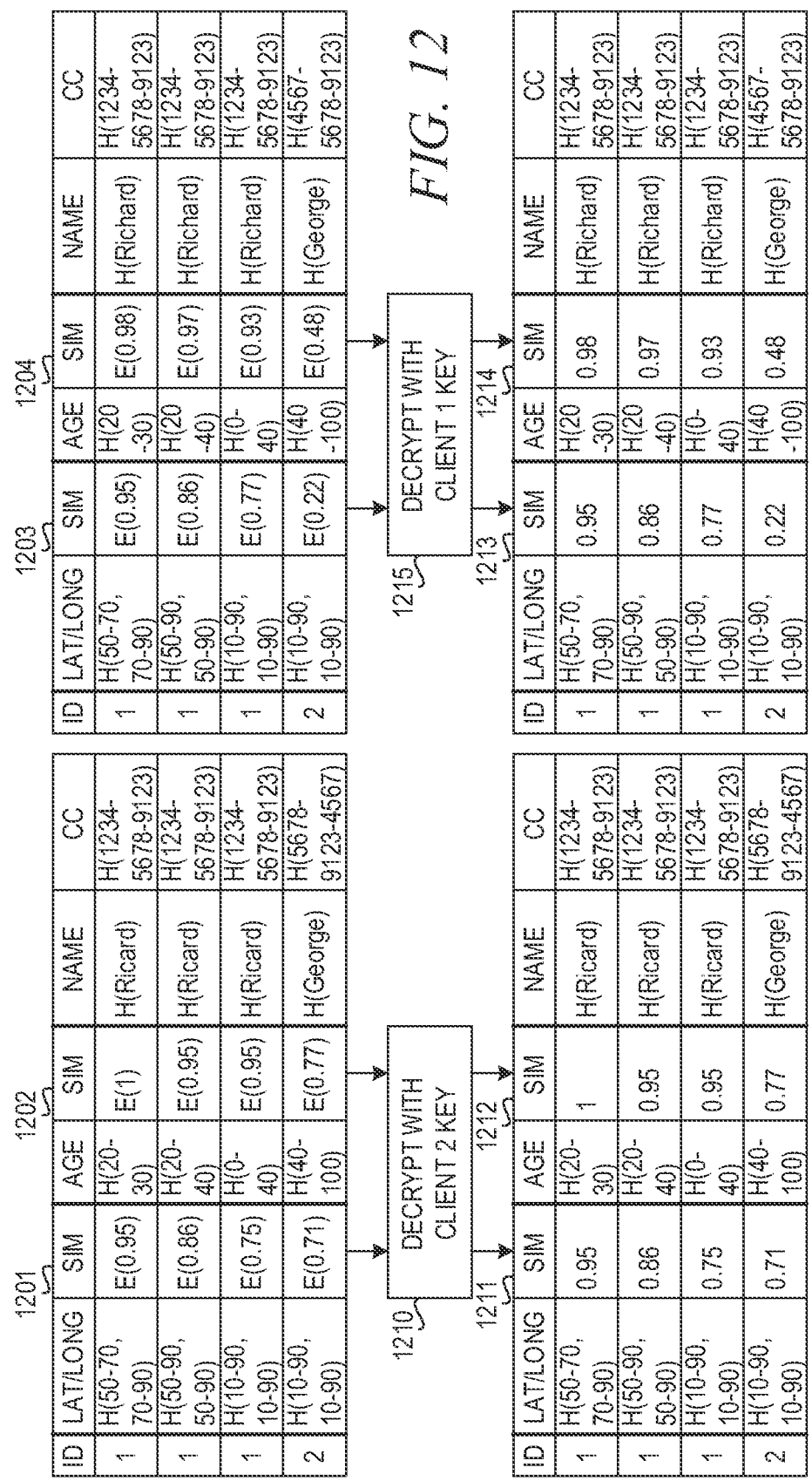
FIG. 12 illustrates retrieval and decryption of the approximately linked record pairs in accordance with an illustrative embodiment.

FIG. 12 illustrates retrieval and decryption of the approximately linked record pairs in accordance with an illustrative embodiment. Each client retrieves the approximately linked record pairs from the STTP. Client 1 decrypts the similarity scores 1201, 1202 with the client 2 public key (block 1210) resulting in decrypted similarity scores 1211, 1212. Client 2 decrypts similarity scores 1203, 1204 with the client 1 public key (block 1215) resulting in decrypted similarity scores 1213, 1214.

The clients filter out noise and computer final linkage results. The clients discard rows with at least one column having a similarity score below a predetermined threshold. In one example embodiment, there may be a different threshold for each similarity score. In another embodiment, each client may have its own thresholds for filtering noise.

In an example embodiment, the predetermined threshold is set to 0.75. As shown in the FIG. 12, the last row would be removed, because of similarity scores being below the threshold. Multiple matches for the same rows (due to the use of the hierarchies) may be refined to a single row by choosing the row with the highest aggregate similarity score. In this example, the first row has the highest aggregate similarity score and will be kept as the only linkage result. The result in this example is a single linkage made despite the typographical errors in the "Name" column, which is possible due to the application of hierarchies.

Figure 13:
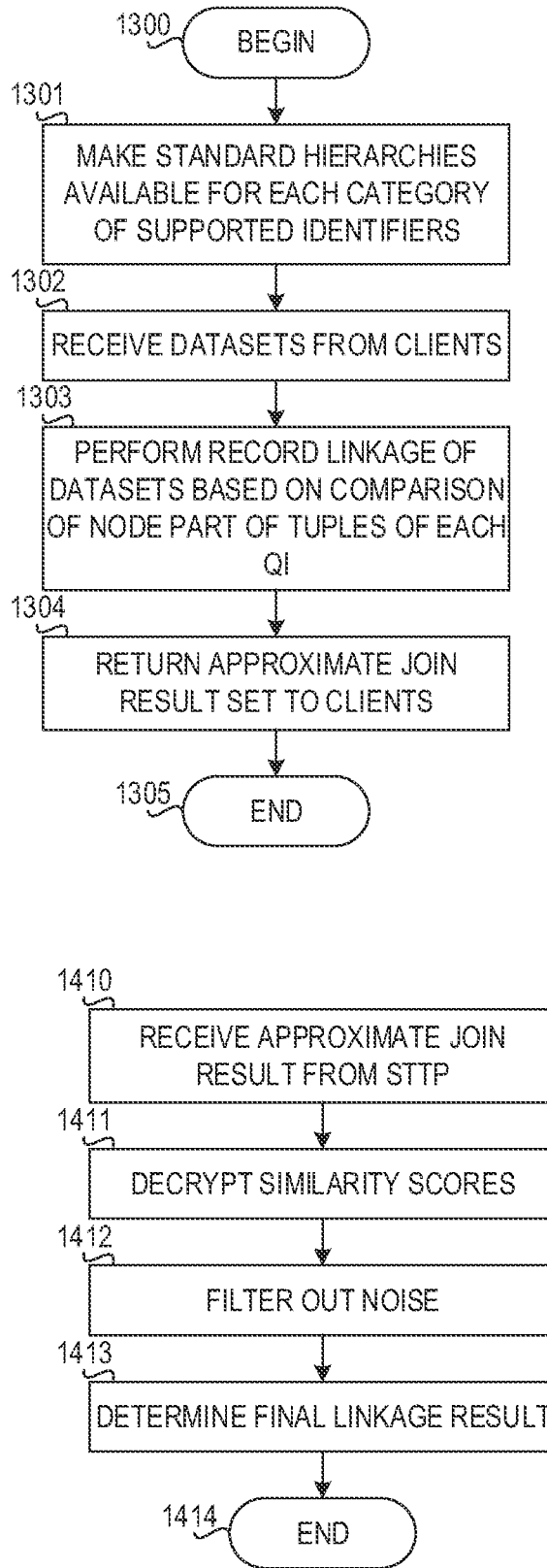
FIG. 13 is a flowchart illustrating operation of a semi-trusted third party for approximate linkage of datasets over encrypted quasi-identifiers in accordance with an illustrative embodiment.

FIG. 13 is a flowchart illustrating operation of a semi-trusted third party for approximate linkage of datasets over encrypted quasi-identifiers in accordance with an illustrative embodiment. Operation begins (block 1300), and the semi-trusted third party (STTP) makes standard hierarchies available for each category of supported identifiers (quasi-identifiers (QIs)) (block 1301). The STTP receives datasets from clients (block 1302) and performs record linkage of the datasets based on comparison of node part of tuples for each QID (block 1303). The STTP returns the approximate join result set to the clients (block 1304). Thereafter, operation ends (block 1305).

Figure 14:
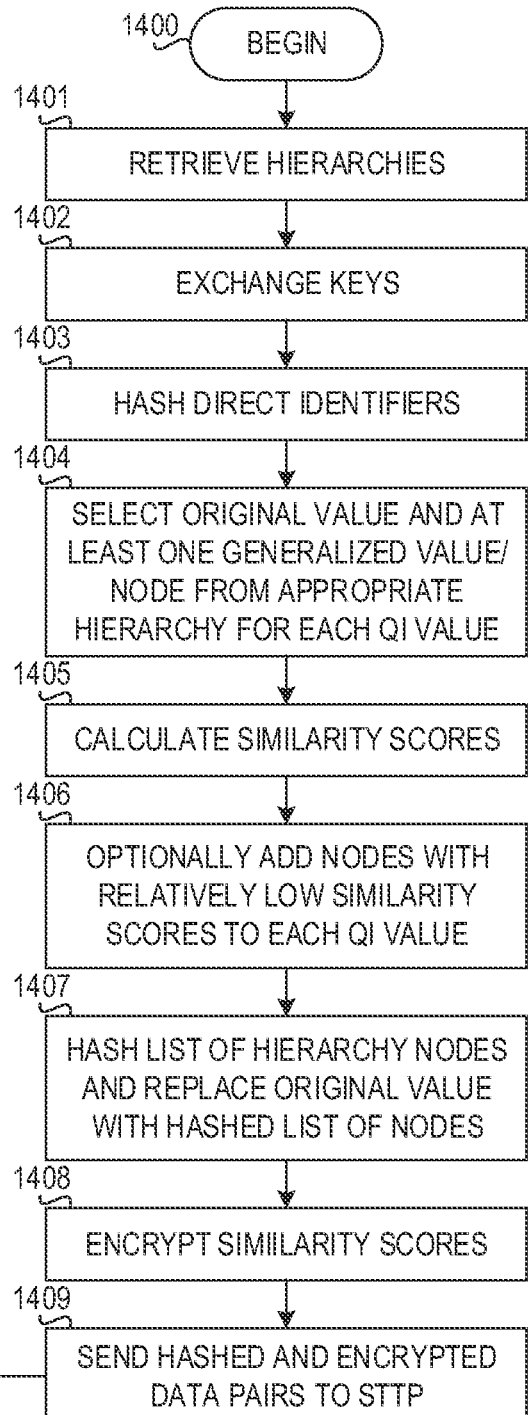
FIG. 14 is a flowchart illustrating operation of a client for approximate linkage of datasets over encrypted quasi-identifiers in accordance with an illustrative embodiment.

FIG. 14 is a flowchart illustrating operation of a client for approximate linkage of datasets over encrypted quasi-identifiers in accordance with an illustrative embodiment. Operation begins (block 1400), and the client retrieves the hierarchies (block 1401) and exchanges keys with the other client (block 1402). The client hashes the direct identifiers (block 1403). The client selects a node corresponding to the original value and at least one generalized value/node from the appropriate hierarchy for each QID value in the dataset (block 1404). The client then calculates similarity scores for each selected node (block 1405).

The client optionally adds nodes with relatively low similarity scores to each QID value (block 1406). The client then hashes the list of hierarchy nodes and replaces the original value with the hashed list of nodes (block 1407). The client also encrypts the similarity scores (block 1408). Then the client sends the hashed and encrypted data pairs to the STTP (block 1409).

Next, the client receives the approximate join result from the STTP (block 1410). The client decrypts the similarity scores (block 1411) and filters out noise (block 1412). Then, the client determines the final linkage result (block 1413). Thereafter, operation ends (block 1414).

As noted above, it should be appreciated that the illustrative embodiments may take the form of an entirely hardware embodiment, an entirely software embodiment or an embodiment containing both hardware and software elements. In one example embodiment, the mechanisms of the illustrative embodiments are implemented in software or program code, which includes but is not limited to firmware, resident software, microcode, etc.

A data processing system suitable for storing and/or executing program code will include at least one processor coupled directly or indirectly to memory elements through a communication bus, such as a system bus, for example. The memory elements can include local memory employed during actual execution of the program code, bulk storage, and cache memories which provide temporary storage of at least some program code in order to reduce the number of times code must be retrieved from bulk storage during execution. The memory may be of various types including, but not limited to, ROM, PROM, EPROM, EEPROM, DRAM, SRAM, Flash memory, solid state memory, and the like.

Input/output or I/O devices (including but not limited to keyboards, displays, pointing devices, etc.) can be coupled to the system either directly or through intervening wired or wireless I/O interfaces and/or controllers, or the like. I/O devices may take many different forms other than conventional keyboards, displays, pointing devices, and the like, such as for example communication devices coupled through wired or wireless connections including, but not limited to, smart phones, tablet computers, touch screen devices, voice recognition devices, and the like. Any known or later developed I/O device is intended to be within the scope of the illustrative embodiments.

Network adapters may also be coupled to the system to enable the data processing system to become coupled to other data processing systems or remote printers or storage devices through intervening private or public networks. Modems, cable modems and Ethernet cards are just a few of the currently available types of network adapters for wired communications. Wireless communication-based network adapters may also be utilized including, but not limited to, 802.11 a/b/g/n wireless communication adapters, Bluetooth wireless adapters, and the like. Any known or later developed network adapters are intended to be within the spirit and scope of the present invention.

The description of the present invention has been presented for purposes of illustration and description, and is not intended to be exhaustive or limited to the invention in the form disclosed. Many modifications and variations will be apparent to those of ordinary skill in the art without departing from the scope and spirit of the described embodiments. The embodiment was chosen and described in order to best explain the principles of the invention, the practical application, and to enable others of ordinary skill in the art to understand the invention for various embodiments with various modifications as are suited to the particular use contemplated. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method, in a data processing system of a first client, for approximate linkage of datasets over quasi-identifiers, the method comprising:
   receiving a generalization logic data structure representing sets of values for each quasi-identifier in a first dataset of the first client;
   for each record in the first dataset:
      generating at least one generalization of a value of a given quasi-identifier in the first dataset based on a selected generalization logic data structure corresponding to the given quasi-identifier, wherein each generalization within the at least one generalization comprises an obfuscated value set and similarity score pair; and
      generating a generalized record for each of the at least one generalization to form a first generalized dataset;
   sending the first generalized dataset to a semi-trusted third party for approximate linkage of the first dataset with a second dataset of a second client;
   receiving an approximate join result from the semi-trusted third party, wherein the approximate join result comprises a set of matching pairs of records from the first generalized dataset and records from a second generalized dataset corresponding to the second dataset of the second client;
   performing post-processing on the approximate join result at least by:
      decrypting similarity scores of the records from the first generalized dataset and the records from the second generalized dataset of the approximate join result;
      comparing each decrypted similarity score to a threshold; and
      discarding matching pairs of records for which a decrypted similarity score is less than the threshold; and
   determining a final linkage result based on the post-processing.

2. The method of claim 1, wherein generating the at least one generalization comprises:
   selecting a set of values in the selected generalization logic data structure that represents a valid generalization of the value of the given quasi-identifier;
   calculating a similarity score for the value of the given quasi-identifier representing a similarity of the value to the selected set of values;
   hashing a representation of the selected set of values; and
   encrypting the similarity score,
   wherein the hashed representation of the selected set of values and the encrypted similarity score comprise the obfuscated value set and similarity score pair.

3. The method of claim 2, wherein encrypting the similarity score comprises encrypting the similarity score using a private key of a private key/public key pair of the first client.

4. The method of claim 1, further comprising:
   for each record in the first dataset:
      generating at least one additional generalization of the value of the given quasi-identifier in the first dataset based on a set of values in the selected generalization logic data structure that does not represent a valid generalization of the value of the given quasi-identifier; and
      adding a record for each of the at least one additional generalization to the first generalized dataset.

5. The method of claim 4, wherein generating the at least one additional generalization comprises:
   selecting the set of values in the selected generalization logic data structure that does not represent a valid generalization of the value of the given quasi-identifier;
   calculating a similarity score for the value of the given quasi-identifier representing a similarity of the value to the selected set of values;
   hashing a representation of the selected set of values; and
   encrypting the similarity score.

6. The method of claim 1, wherein the semi-trusted third party performs approximate linkage by performing a table join operation on the first generalized dataset and a second generalized dataset corresponding to the second dataset of the second client.

7. The method of claim 1, wherein the semi-trusted third party performs approximate linkage by applying a set of rules to the first generalized dataset and a second generalized dataset corresponding to the second dataset of the second client to identify a set of matching records and returning the set of matching records as the approximate join result.

8. The method of claim 1, wherein performing post-processing comprises:
   identifying a plurality of matching pairs of records that correspond to the same record of the first dataset;
   selecting a matching pair of records within the plurality of matching pairs of records having a highest aggregate similarity score; and
   removing the non-selected matching pairs of records from the approximate join result.

9. The method of claim 1, further comprising encrypting direct identifiers in the first dataset using a private key of a private key/public key pair of the first client.

10. The method of claim 1, wherein performing post-processing comprises decrypting direct identifiers in the records from the second generalized dataset using a public key of a private key/public key pair of the second client.

11. The method of claim 1, wherein the semi-trusted third party provides the generalization logic data structure representing sets of values for each quasi-identifier to the first client and the second client.

12. The method of claim 1, wherein the selected generalization logic data structure comprises a hierarchy of nodes, wherein each leaf node corresponds to a domain value of the given quasi-identifier, wherein each intermediate node corresponds to a generalization of respective child nodes, and wherein a root of the hierarchy corresponds to an entire domain of values of the given quasi-identifier.

13. The method of claim 1, wherein the given quasi-identifier is a location identifier, wherein the selected generalization logic data structure comprises a pyramid of nodes, wherein each leaf node corresponds to an area, wherein each intermediate node corresponds to a generalization of respective child nodes, and wherein a root of the pyramid corresponds to an entire area of possible location values of the given quasi-identifier.

14. A computer program product comprising a computer readable storage medium having a computer readable program stored therein, wherein the computer readable program, when executed on a computing device, causes the computing device to:
receive a generalization logic data structure representing sets of values for each quasi-identifier in a first dataset of the first client;
for each record in the first dataset:
generate at least one generalization of a value of a given quasi-identifier in the first dataset based on a selected generalization logic data structure corresponding to the given quasi-identifier, wherein each generalization within the at least one generalization comprises an obfuscated value set and similarity score pair; and
generate a generalized record for each of the at least one generalization to form a first generalized dataset;
send the first generalized dataset to a semi-trusted third party for approximate linkage of the first dataset with a second dataset of a second client;
receive an approximate join result from the semi-trusted third party, wherein the approximate join result comprises a set of matching pairs of records from the first generalized dataset and records from a second generalized dataset corresponding to the second dataset of the second client;
perform post-processing on the approximate join result at least by:
decrypting similarity scores of the records from the first generalized dataset and the records from the second generalized dataset of the approximate join result;
comparing each decrypted similarity score to a threshold; and
discarding matching pairs of records for which a decrypted similarity score is less than the threshold; and
determine a final linkage result based on the post-processing.

15. The computer program product of claim 14, wherein generating the at least one generalization comprises:
selecting a set of values in the selected generalization logic data structure that represents a valid generalization of the value of the given quasi-identifier;
calculating a similarity score for the value of the given quasi-identifier representing a similarity of the value to the selected set of values;
hashing a representation of the selected set of values; and
encrypting the similarity score,
wherein the hashed representation of the selected set of values and the encrypted similarity score comprise the obfuscated value set and similarity score pair.

16. The computer program product of claim 14, wherein the computer readable program further causes the computing device to:
for each record in the first dataset:
generate at least one additional generalization of the value of the given quasi-identifier in the first dataset based on a set of values in the selected generalization logic data structure that does not represent a valid generalization of the value of the given quasi-identifier; and
add a record for each of the at least one additional generalization to the first generalized dataset.

17. The computer program product of claim 16, wherein generating the at least one additional generalization comprises:
selecting the set of values in the selected generalization logic data structure that does not represent a valid generalization of the value of the given quasi-identifier;
calculating a similarity score for the value of the given quasi-identifier representing a similarity of the value to the selected set of values;
hashing a representation of the selected set of values; and
encrypting the similarity score.

18. An apparatus comprising:
a processor; and
a memory coupled to the processor, wherein the memory comprises instructions which, when executed by the processor, cause the processor to:
receive a generalization logic data structure representing sets of values for each quasi-identifier in a first dataset of the first client;
for each record in the first dataset:
generate at least one generalization of a value of a given quasi-identifier in the first dataset based on a selected generalization logic data structure corresponding to the given quasi-identifier, wherein each generalization within the at least one generalization comprises an obfuscated value set and similarity score pair; and
generate a generalized record for each of the at least one generalization to form a first generalized dataset;
send the first generalized dataset to a semi-trusted third party for approximate linkage of the first dataset with a second dataset of a second client;
receive an approximate join result from the semi-trusted third party, wherein the approximate join result comprises a set of matching pairs of records from the first generalized dataset and records from a second generalized dataset corresponding to the second dataset of the second client;
perform post-processing on the approximate join result at least by:
decrypting similarity scores of the records from the first generalized dataset and the records from the second generalized dataset of the approximate join result;
comparing each decrypted similarity score to a threshold; and
discarding matching pairs of records for which a decrypted similarity score is less than the threshold; and
determine a final linkage result based on the post-processing.

19. The apparatus of claim 18, wherein generating the at least one generalization comprises:
- selecting a set of values in the selected generalization logic data structure that represents a valid generalization of the value of the given quasi-identifier;
- calculating a similarity score for the value of the given quasi-identifier representing a similarity of the value to the selected set of values;
- hashing a representation of the selected set of values; and
- encrypting the similarity score,
- wherein the hashed representation of the selected set of values and the encrypted similarity score comprise the obfuscated value set and similarity score pair.

20. The apparatus of claim 18, wherein the instructions further cause the processor to:
- for each record in the first dataset:
    - generate at least one additional generalization of the value of the given quasi-identifier in the first dataset based on a set of values in the selected generalization logic data structure that does not represent a valid generalization of the value of the given quasi-identifier; and
    - add a record for each of the at least one additional generalization to the first generalized dataset.

* * * * *